United States Patent
Ye et al.

(10) Patent No.: US 10,075,441 B2
(45) Date of Patent: Sep. 11, 2018

(54) METHOD FOR TRANSFERRING AUTHORIZATION INFORMATION, RELAY DEVICE, AND SERVER

(71) Applicant: Huawei Technologies Co., Ltd., Shenzhen, Guangdong (CN)

(72) Inventors: Yuxu Ye, Shenzhen (CN); Min Zha, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/272,217

(22) Filed: May 7, 2014

(65) Prior Publication Data

US 2014/0245405 A1     Aug. 28, 2014

Related U.S. Application Data

(63) Continuation of application No. PCT/CN2012/083290, filed on Oct. 22, 2012.

(30) Foreign Application Priority Data

Nov. 8, 2011   (CN) .......................... 2011 1 0349928

(51) Int. Cl.
   *H04L 29/06*     (2006.01)
   *H04L 29/12*     (2006.01)

(52) U.S. Cl.
   CPC ...... *H04L 63/0892* (2013.01); *H04L 61/2015* (2013.01); *H04L 61/6059* (2013.01); *H04L 61/2061* (2013.01); *H04L 61/6068* (2013.01)

(58) Field of Classification Search
   CPC ... H04L 61/20; H04L 61/2007; H04L 61/203; H04L 61/2015; H04L 61/6059; H04L 63/0892; H04L 61/2061; H04L 61/6068

(Continued)

(56) References Cited

U.S. PATENT DOCUMENTS 6,298,383 B1 * 10/2001 Gutman .............. H04L 63/0281
                                                        709/229
6,427,174 B1 *  7/2002 Sitaraman et al. ........... 709/245

(Continued)

FOREIGN PATENT DOCUMENTS

CN       101175294 A      5/2008
CN       101184113 A      5/2008

(Continued)

OTHER PUBLICATIONS

Droms et al., "Dynamic Host Configuration Protocol for IPv6 (DHCPv6)," Network Working Group, Request for Comments: 3315, Standards Track, The Internet Society, Reston, Virginia (Jul. 2003).*

(Continued)

*Primary Examiner* — Yogesh Paliwal
(74) *Attorney, Agent, or Firm* — Leydig, Voit & Mayer, Ltd.

(57) ABSTRACT

Embodiments of the present application provide a method for transferring authorization information, a relay device, and a server. The method includes: receiving, by a DHCPv6 relay device, authorization information delivered by an AAA server; and inserting an option into a DHCPv6 Relay-Forward message, encapsulating the authorization information in the option, and sending the option to a DHCPv6 server. By using the technical solutions of the present application, a DHCPv6 relay device sends authorization information delivered by an AAA server to a DHCPv6 server, so that the DHCPv6 server can provide a correct configuration for a DHCPv6 client according to the authorization information delivered by the AAA server.

7 Claims, 4 Drawing Sheets

(58) Field of Classification Search
USPC .......................................................... 726/4
See application file for complete search history.

(56) References Cited

U.S. PATENT DOCUMENTS

| | | | |
|---|---|---|---|
| 7,143,435 | B1 | 11/2006 | Droms et al. |
| 7,502,929 | B1 | 3/2009 | Schnizlein et al. |
| 2003/0237002 | A1* | 12/2003 | Oishi ..................... H04L 63/08 726/10 |
| 2006/0080728 | A1 | 4/2006 | Wen et al. |
| 2009/0037603 | A1 | 2/2009 | Battello et al. |
| 2009/0138619 | A1* | 5/2009 | Schnizlein .......... H04L 61/2015 709/245 |
| 2009/0290539 | A1 | 11/2009 | Xia et al. |
| 2010/0269155 | A1* | 10/2010 | Droms et al. ..................... 726/3 |

FOREIGN PATENT DOCUMENTS

| | | |
|---|---|---|
| CN | 101471767 A | 7/2009 |
| CN | 101651662 A | 2/2010 |
| JP | 2004207788 A | 7/2004 |
| JP | 2006115499 A | 4/2006 |

OTHER PUBLICATIONS

B. Lourdelet, W. Dec, Ed. B. Sarikaya, G. Zorn, D. Miles "RADIUS Attributes for IPv6 Access Networks", Network Working Group, Internet-Draft, Jul. 6, 2010.*

Rigney et al, "Radius Extensions," Network Working Group, Request for Comments: 2869, pp. 1-47, Internet Society, Reston, Virginia (Jun. 2000).

Lourdelet et al, "RADIUS Attributes for IPv6 Access Networks," Network Working Group, Internet Draft, pp. 1-15, Internet Society, Reston, Virginia (Jul. 11, 2011).

Yeh, "Authorization Option for DHCPv6 Relay Agents on Broadband Access Server," DHC Working Group, Internet Draft, pp. 1-9, Internet Society, Reston, Virginia (Mar. 5, 2012).

Yeh et al., "Radius Option for DHCPv6 Relay Agents on Broadband Access Server," DHC Working Group, pp. 1-9, Internet Society, Reston, Virginia (May 7, 2012).

Dec et al., "Radius Attributes for IPv6 Access Networks," Internet Engineering Task Force, Request for Comments: 6911, pp. 1-15, Internet Society, Reston, Virginia (Apr. 2013).

Yeh et al., "Radius Option for the DHCPv6 Relay Agent," Internet Engineering Task Force, Request for Comments: 7037, pp. 1-10, Internet Society, Reston, Virginia (Oct. 2013).

Rigney et al., "Remote Authentication Dial in User Service (RADIUS)," Network Working Group, Request for Comments: 2865, pp. 1-76, Internet Society, Reston, Virginia (Jun. 2000).

Droms, "Dynamic Host Configuration Protocol," Network Working Group, Request for Comments: 2131, pp. 1-45, The Internet Society, Reston, Virginia (Mar. 1997).

Alexander et al., "DHCP Options and BOOTP Vendor Extensions," Network Working Group, Request for Comments: 2132 (Mar. 1997).

* cited by examiner

METHOD FOR TRANSFERRING AUTHORIZATION INFORMATION, RELAY DEVICE, AND SERVER

CROSS-REFERENCE TO RELATED APPLICATIONS

This application is a continuation of International Patent Application No. PCT/CN2012/083290, filed on Oct. 22, 2012, which claims priority to Chinese Patent Application No. 201110349928.7, filed on Nov. 8, 2011, both of which are hereby incorporated by reference in their entireties.

TECHNICAL FIELD

The present application relates to a network communications technology, and in particular, to a method for transferring authorization information, a relay device, and a server.

BACKGROUND

Typical networking of the Dynamic Host Configuration Protocol for IPv6 (DHCPv6) that supports the Internet Protocol Version 6 (IPv6) includes three roles: a DHCPv6 client, a DHCPv6 server, and a DHCPv6 relay. The DHCPv6 client is a device that dynamically acquires an IPv6 address, a delegated IPv6 prefix, or other network configuration parameters. The DHCPv6 server is a device that is responsible for allocating an IPv6 address, an IPv6 prefix, or other network configuration parameters to the DHCPv6 client. When the DHCPv6 server and the DHCPv6 client are not within the scope of a same link, the DHCPv6 server and the DHCPv6 client need to use a DHCPv6 relay to forward a message, thereby avoiding deployment of a DHCPv6 server within the scope of each link. This saves costs and facilitates centralized management.

To ensure security of the allocation of an IPv6 address, a delegated IPv6 prefix, and other network configuration parameters, on existing DHCPv6 networking, a DHCPv6 client needs to be AAA-authenticated before DHCPv6 allocation is performed, and the DHCPv6 client can be allocated with an IPv6 address, an IPv6 prefix, and other network configuration parameters only after the authentication is successful.

In a practical application process, when determining that the authentication of the DHCPv6 client is successful, an AAA (Authentication-Authorization-Accounting) server authorizes some information related to address allocation to the DHCPv6 relay by using an Access-Accept message. However, currently, the authorization information cannot be transferred to the DHCPv6 server by using a DHCPv6 process, which limits flexibility of providing correct configurations to the DHCPv6 client by the DHCPv6 server and application scenarios.

SUMMARY

The present application provides a method for transferring authorization information, a relay device, and a server, which are used to send authorization information delivered by an AAA server to a DHCPv6 server, so that the DHCPv6 server can provide correct configuration information for a DHCPv6 client.

An embodiment of the present application provides a method for transferring authorization information, including:

receiving authorization information delivered by an AAA server; and inserting an option into a DHCPv6 Relay-Forward message, encapsulating the authorization information in the option, and sending the option to a DHCPv6 server.

An embodiment of the present application provides a relay device, including:

a first receiving module, configured to receive authorization information delivered by an AAA server; and an encapsulating module, configured to insert an option into a DHCPv6 Relay-Forward message, encapsulate the authorization information in the option, and send the option to a DHCPv6 server.

An embodiment of the present application provides a server, including:

a third receiving module, configured to receive authorization information which is encapsulated by using an option of a DHCPv6 Relay-Forward message and sent by a relay device, where the authorization information is delivered by an AAA server to the relay device; and an allocating module, configured to allocate corresponding configuration information to a DHCPv6 client according to the authorization information.

According to the method for transferring authorization information, the relay device, and the server in the embodiments of the present application, the relay device inserts an option into a DHCPv6 Relay-Forward message, encapsulates authorization information in the option, and sends the option to a DHCPv6 server, so that the DHCPv6 server can provide a correct configuration for a DHCPv6 client according to the authorization information, thereby solving the problem of lack of information in the prior art caused by a failure of transferring authorization information to a DHCPv6 server by using a DHCPv6 process; and further, when the authorization information is information related to address allocation, such as designation of a specific prefix pool, a specific address pool, a specific address, or a specific prefix for the DHCPv6 client, the DHCPv6 server can allocate a correct address configuration to the DHCPv6 client according to the authorization information.

BRIEF DESCRIPTION OF DRAWINGS

To describe the technical solutions in the embodiments of the present application more clearly, the following briefly introduces the accompanying drawings required for describing the embodiments. Apparently, the accompanying drawings in the following description show some embodiments of the present application, and persons of ordinary skill in the art may still derive other drawings from these accompanying drawings without creative efforts.

DESCRIPTION OF EMBODIMENTS

To make the objectives, technical solutions, and advantages of the embodiments of the present application more clear, the following clearly describes the technical solutions in the embodiments of the present application with reference to the accompanying drawings in the embodiments of the present application. Apparently, the described embodiments are a part rather than all of the embodiments of the present application. All other embodiments obtained by persons of ordinary skill in the art based on the embodiments of the present application without creative efforts shall fall within the protection scope of the present application.

Figure 1:
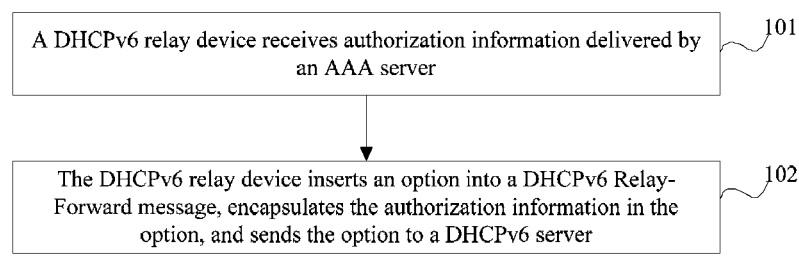
FIG. 1 is a flowchart of a method for transferring authorization information according to an embodiment of the present application.

FIG. 1 is a flowchart of a method for transferring authorization information according to an embodiment of the present application. As shown in FIG. 1, the method in this embodiment includes:

Step 101: A DHCPv6 relay device receives authorization information delivered by an AAA server.

This embodiment is applicable to a DHCPv6 allocation process in which a device with a DHCPv6 relay function (called a relay device hereinafter) exists and participates in AAA authentication. The DHCPv6 allocation process is an address allocation process in which information, such as an IPv6 address, is allocated to a DHCPv6 client. In embodiments of the present application, the DHCPv6 client may be a customer premise equipment (CPE), a personal computer (PC), or the like; and the relay device may be a network access server (NAS).

In a practical application, when the DHCPv6 client needs to solicit IPv6 address information, the DHCPv6 client sends a Solicit message to solicit address information. The Solicit message carries such information as a Client Identifier option, an Identity Association for Non-temporary Addresses (IA_NA) option used for requesting an IPv6 address, and an Identity Association for Prefix Delegation (IA_PD) option used for requesting a delegated prefix, where the address information that needs to be solicited by the DHCPv6 client mainly refers to an IPv6 address, an IPv6 prefix, other network configuration parameters, and the like. When the DHCPv6 client is a CPE or a PC, the Client Identifier option may include a media access control (MAC) address of the CPE or a MAC address of the PC.

After receiving the Solicit message, the relay device sends an Access-Request message to the AAA server requesting identity authentication on the DHCPv6 client. The Access-Request message may carry such information as an access port identifier (such as NAS-Port or NAS-Port-ID) or a DHCPv6 client identifier. When the DHCPv6 client is the CPE or the PC, the DHCPv6 client identifier may be the MAC address of the CPE or the MAC address of the PC.

After receiving the Access-Request message, the AAA server performs identity authentication on the DHCPv6 client according to the information carried in the Access-Request message, and returns, to the relay device by using an Access-Accept message, a result that the DHCPv6 client passes the authentication or returns, to the relay device by using an Access-Reject message, a result that the DHCPv6 client fails to pass the identity authentication. When the DHCPv6 client passes the identity authentication, the AAA server further delivers some authorization information by using the Access-Accept message, where the authorization information delivered by the AAA server may include a name of an address pool or a name of a prefix pool, or may include a designated IPv6 address or a designated IPv6 prefix. For example, the AAA server may request a DHCPv6 server to allocate an IPv6 address within an address pool for a wide area network (WAN) of the DHCPv6 client by designating a name of the address pool; the AAA server may request the DHCPv6 server to allocate a delegated IPv6 prefix within a prefix pool for the DHCPv6 client by designating a name of the prefix pool; the AAA server may request the DHCPv6 server to allocate a specific IPv6 address for the DHCPv6 client by designating the IPv6 address; and the AAA server may request the DHCPv6 server to allocate a specific delegated IPv6 prefix for the DHCPv6 client by designating the IPv6 prefix.

Currently, a Radius address or prefix pool name attribute defined by IETF RFC2869 is Framed-Pool (Attribute 88); a Radius delegated IPv6 prefix attribute defined by IETF RFC4818 is Delegated-IPv6-Prefix (Attribute 123); and a Radius IPv6 address attribute defined by a Radext work group draft draft-ietf-radext-ipv6-access is Framed-IPv6-Address, a Radius delegated IPv6 prefix pool name attribute is Delegated-IPv6-Prefix-Pool, and a Radius stateful IPv6 address pool name attribute is Stateful-IPv6-Address-Pool. In the embodiments of the present application, the prefix pool name or the address pool name designated in the Radius attribute Framed-Pool, Delegated-IPv6-Prefix-Pool, or Stateful-IPv6-Address-Pool, the delegated IPv6 prefix designated in the Radius attribute Delegated-IPv6-Prefix, and the IPv6 address designated in the Radius attribute Framed-IPv6-Address may all be used as the authorization information delivered by the AAA server to the relay device (for example, a network access server NAS) after the DHCPv6 client passes the authentication.

Step 102: The DHCPv6 relay device inserts an option into a DHCPv6 Relay-Forward message, encapsulates the authorization information in the option, and sends the option to the DHCPv6 server.

In this embodiment, in order to send the authorization information delivered by the AAA server to the DHCPv6 server, the relay device inserts the option into a Relay-Forward message to be sent, encapsulates the authorization information in the option, and sends the option to the DHCPv6 server.

After receiving the Relay-Forward message, the DHCPv6 server acquires the authorization information by parsing the Relay-Forward message and performs a corresponding operation according to the authorization information. For example, when the authorization information is information related to address allocation, the DHCPv6 server may allocate address information to the DHCPv6 client according to the authorization information. More specifically, when the authorization information is a name of an address pool or a name of a prefix pool, the DHCPv6 server allocates an IPv6 address or a delegated IPv6 prefix from the address pool or the prefix pool to the DHCPv6 client.

In this embodiment, after receiving authorization information delivered by an AAA server, a relay device inserts a corresponding option into a Relay-Forward message, encapsulates the authorization information in the option, and sends the option to a DHCPv6 server, so that the DHCPv6 server can provide correct configuration information to a DHCPv6 client according to the authorization information. This solves the problem in the prior art that authorization information delivered by an AAA server cannot be transferred to a DHCPv6 server by using a DHCPv6 process; and further, when the authorization information is related to address allocation, the DHCPv6 server can dynamically allocate an IPv6 address or an IPv6 prefix in a designated address pool or a designated prefix pool to the DHCPv6 client according to the authorization information, or designate a specific IPv6 address or a specific IPv6 prefix for the DHCPv6 client according to the authorization information, thereby better meeting a flexibility requirement of an IPv6 service on configuration of a user address.

The following embodiment uses a DHCPv6 allocation process as an example to describe a process of transferring authorization information in detail.

Figure 2A:
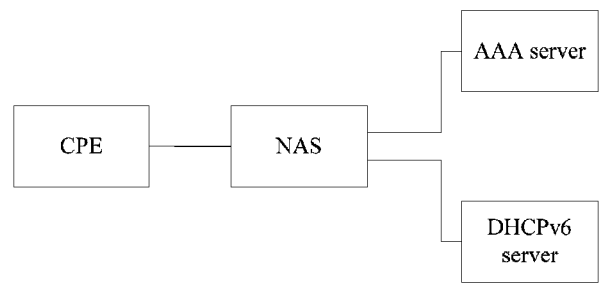
FIG. 2A is a structural diagram of a network for DHCPv6 authentication and address allocation according to an embodiment of the present application.
Figure 2B:
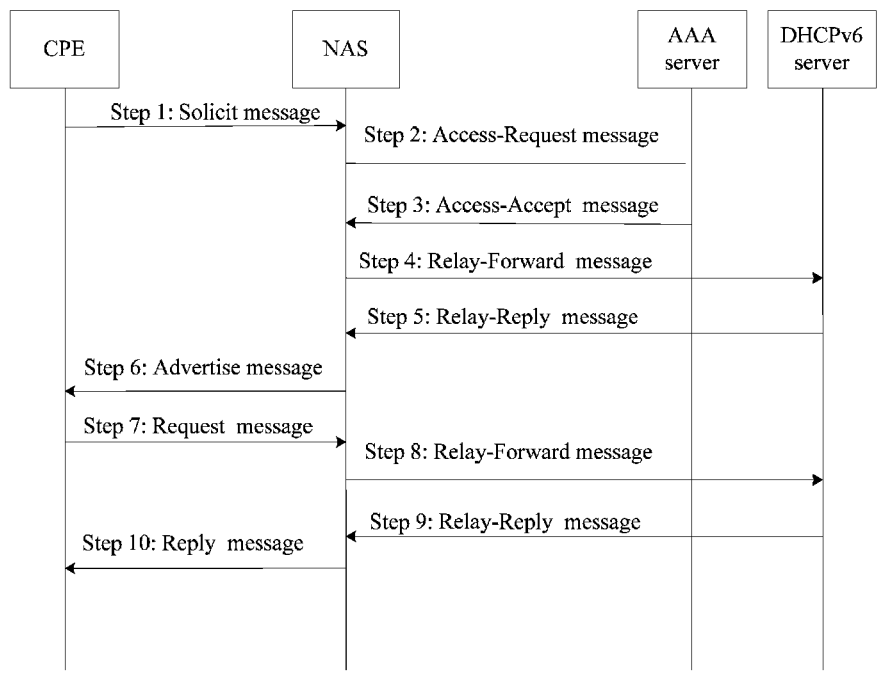
FIG. 2B is a flowchart of a method for allocating an IPv6 address according to an embodiment of the present application.

FIG. 2A is a structural diagram of a network for DHCPv6 authentication and address allocation according to an embodiment of the present application. As shown in FIG. 2A, a relay device in this embodiment is a NAS, and a DHCPv6 client is a CPE. FIG. 2B is a flowchart of a method for allocating an IPv6 address according to an embodiment of the present application. As shown in FIG. 2B, the method in this embodiment includes:

Step 1: A CPE sends a Solicit message to a NAS, so as to send a DHCPv6 solicit.

Step 2: After receiving the Solicit message sent by the CPE, the NAS sends an Access-Request message to an AAA server, so as to request the AAA server to perform authentication on the CPE.

Step 3: The AAA server performs identity authentication on the CPE, and after the CPE passes the authentication, encapsulates authorization information in an Access-Accept message, and returns the Access-Request message to the NAS.

In this embodiment, one or more pieces of authorization information may exist. Each piece of the authorization information may be a name of an address pool or a name of a prefix pool, such as Framed-pool, Delegated-IPv6-Prefix-Pool, Stateful-IPv6-Address-Pool or the like.

Step 4: After receiving the Access-Accept message, the NAS acquires the authorization information of the CPE, encapsulates both the Solicit message from the CPE and the authorization information from the AAA server in a Relay-Forward message, and send the Relay-Forward message to the DHCPv6 server.

A first implementation manner in which the NAS encapsulates the authorization information in the Relay-Forward message is as follows:

The NAS inserts an option (which may also be called a DHCPv6 option) corresponding to each piece of the authorization information into the Relay-Forward message, for example, when two pieces of the authorization information are delivered by the AAA server, one piece of the authorization information is Framed-Pool, and the other piece of the authorization information is Delegated-IPv6-Prefix-Pool, the NAS inserts two DHCPv6 options into the Relay-Forward message, where one DHCPv6 option stores the authorization information Delegated-IPv6-Prefix-Pool, and the other DHCPv6 option stores the authorization information Framed-Pool.

Then, the NAS encapsulates each piece of the authorization information in the corresponding option and sends the option to the DHCPv6 server.

Figure 2C:
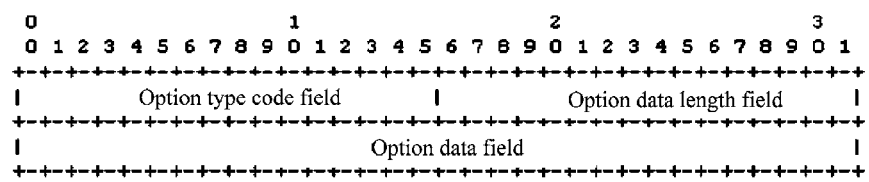
FIG. 2C shows a format of a DHCPv6 option according to an embodiment of the present application.

A format of the DHCPv6 option is shown in FIG. 2C, mainly including: an option type code field of a 2-byte length, an option data length field of a 2-byte length, and an option data field of a variable length. The option type code field is an identifier of an option type; the option data length field is used to identify a length of the option data field, and the option data field may be used to fill in content of the authorization information. For a more specific example, when the authorization information is an address pool or a prefix pool related to the address allocation, the corresponding option may be recorded as Option_Pool_Name, where the option type code field is a type code corresponding to Option_Pool_Name, and the option data field is used to fill in the name of the authorized address pool or prefix pool, for example, when the authorization information is Framed-Pool, the option data field may be filled with a character string of a name of an identifier (address or prefix) pool provided by Framed-Pool.

A second implementation manner in which the NAS encapsulates the authorization information in the Relay-Forward message is as follows:

The NAS inserts an option (in this implementation, the option may be called a container) corresponding to all the authorization information into the Relay-Forward message and places each piece of the authorization information in the option (or the container) by using sub-options; and then the NAS sends the option (or the container) to the DHCPv6 server.

In this implementation manner, the corresponding option (or the container) may be recorded as Option_Authorization and its format is also shown in FIG. 2C, mainly including: an option type code field of a 2-byte length, an option data length field of a 2-byte length, and an option data field of a variable length. The option type code field may be recorded as a type code corresponding to Option_Authorization, the option data field may be filled with the sub-options corresponding to the pieces of authorization information, and the sub-options may be recorded as authorization-options. Specifically, the NAS encapsulates a sub-option authorization-options corresponding to each piece of the authorization information in the Option_Authorization option (or the container), and sends the sub-option to the DHCPv6 server by using the Relay-Forward message.

Figure 2D:
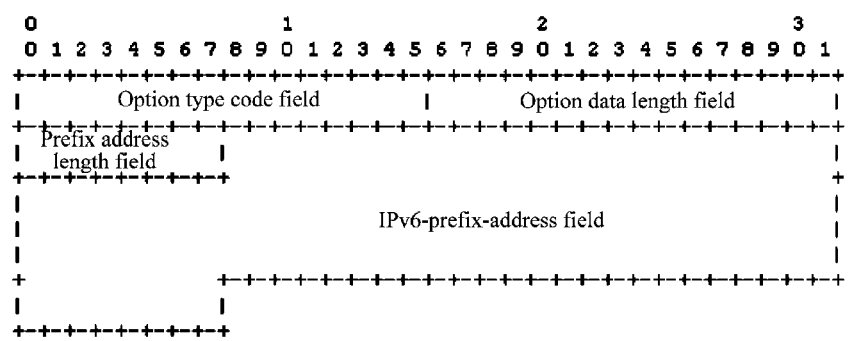
FIG. 2D shows a format of a sub-option Option_Address_Prefix_Auth according to an embodiment of the present application.

Each sub-option may comply with a data structure of a DHCPv6 option shown in FIG. 2C and data structures of some sub-options may also be extended based on FIG. 2C. For example, when the authorization information delivered by the AAA server is used to designate a user IPv6 address or a delegated IPv6 prefix, the corresponding sub-option may be recorded as Option_Address_Prefix_Auth and its format may use a data structure shown in FIG. 2D. The data structure shown in FIG. 2D includes an option type code field of a 2-byte length, an option data length field of a 2-byte length, a prefix address length field of a 1-byte length, and an IPv6-prefix-address field of a 16-byte length. The option type code field is a type code corresponding to Option_Address_Prefix_Auth, and when the prefix address length (field) is 128, the IPv6-prefix-address (field) is correspondingly an IPv6 address.

The sub-option authorization-options may be the foregoing Option_Pool_Name used to encapsulate a designated name of an address pool or a prefix pool, or may be the foregoing Option_Address_Prefix_Auth used to encapsulate a designated address or prefix.

Step 5: The DHCPv6 server allocates IPv6 address information to the CPE according to the authorization information in the Relay-Forward message, encapsulates the allocated IPv6 address information in a Relay-Reply message, and returns the Relay-Reply message to the NAS functioning as a DHCPv6 relay device.

The IPv6 address information may be such information as an IPv6 address or a delegated IPv6 prefix.

Step 6: The NAS encapsulates the IPv6 address information returned by the DHCPv6 server in an Advertise message and sends the Advertise message to the CPE.

Step 7: The CPE sends a Request message to the NAS and the IPv6 address information is carried in the Request message.

Step 8: The NAS forwards the Relay-Forward message to the DHCPv6 server.

The Relay-Forward message includes the IPv6 address information in the Request message.

Step 9: The DHCPv6 server returns the Relay-Reply message to the NAS.

The Relay-Reply message includes the IPv6 address information in response to a request in the Relay-Forward message.

Step 10: The NAS returns a Reply message to the CPE.

The Reply message includes the IPv6 address information in the Relay-Reply message.

Step 7 to step 10 describe a process in which the CPE notifies the DHCPv6 server that the CPE has acquired the IPv6 address information. The process is the same as that in the prior art and therefore is not described in detail in this embodiment.

In this embodiment, a NAS inserts a DHCPv6 option into a Relay-Forward message and sends authorization information delivered by an AAA server to a DHCPv6 server by using the DHCPv6 option; the DHCPv6 server allocates correct IPv6 address information to a CPE according to the authorization information encapsulated in the received option, thereby solving the problem in the prior art that authorization information delivered by an AAA server and related to address information cannot be transferred to a DHCPv6 server by using a DHCPv6 process; and further, in this embodiment, the authorization information delivered by the AAA server is sent to the DHCPv6 server, so that the DHCPv6 server can dynamically allocate an IPv6 address or an IPv6 prefix in a designated address pool or prefix pool to a DHCPv6 client according to the authorization information, or designates a specific IPv6 address or IPv6 prefix for a DHCPv6 client according to the authorization information, thereby better fulfilling a flexibility requirement of an IPv6 service on configuration of a user address.

In addition, by using the method in this embodiment, the AAA server and the DHCPv6 server may be two devices independent from each other, thereby solving a network restraint caused by combining the AAA server and the DHCPv6 server into one server and better facilitating development of an IPv6 service.

It should be noted herein that this embodiment uses authorization information related to address allocation in a DHCPv6 allocation process as an example for description but the present application is not limited thereto. Regardless whether the authorization information is related to address allocation, the DHCPv6 option may be inserted into the Relay-Forward message and the authorization information delivered by the AAA may be encapsulated in the DHCPv6 option so as to send the authorization information to the DHCPv6 server.

Figure 3:
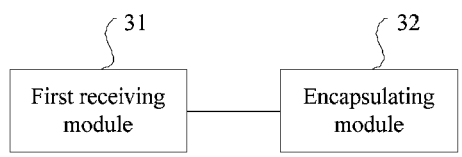
FIG. 3 is a schematic structural diagram of a relay device according to an embodiment of the present application.

FIG. 3 is a schematic structural diagram of a relay device according to an embodiment of the present application. As shown in FIG. 3, the relay device in this embodiment includes a first receiving module 31 and an encapsulating module 32.

The first receiving module 31 is configured to receive authorization information delivered by an AAA server. The encapsulating module 32 is connected to the first receiving module 31 and is configured to insert an option into a Relay-Forward message in a DHCPv6 process, encapsulate the authorization information in the option, and send the option to a DHCPv6 server.

The functional modules of the relay device described in this embodiment are configured to execute the process of the method for transferring authorization information shown in FIG. 1. For detailed operation principles, no further details are provided herein and reference may be made to the descriptions in the foregoing method embodiments.

The relay device in this embodiment, after receiving authorization information delivered by an AAA server, inserts an option into a Relay-Forward message, and sends the authorization information to a DHCPv6 server by means of the option, so that the DHCPv6 server can provide a correct configuration for a DHCPv6 client according to the authorization information, thereby solving the problem in the prior art that authorization information delivered by an AAA server cannot be transferred to a DHCPv6 server by using a DHCPv6 process. Further, when the authorization information is related to address allocation, the DHCPv6 server can dynamically allocate an IPv6 address or an IPv6 prefix in a designated address pool or prefix pool to the DHCPv6 client according to the authorization information, or designates a specific IPv6 address or IPv6 prefix for the DHCPv6 client according to the authorization information, thereby better fulfilling a flexibility requirement of an IPv6 service on configuration of a user address.

Figure 4:
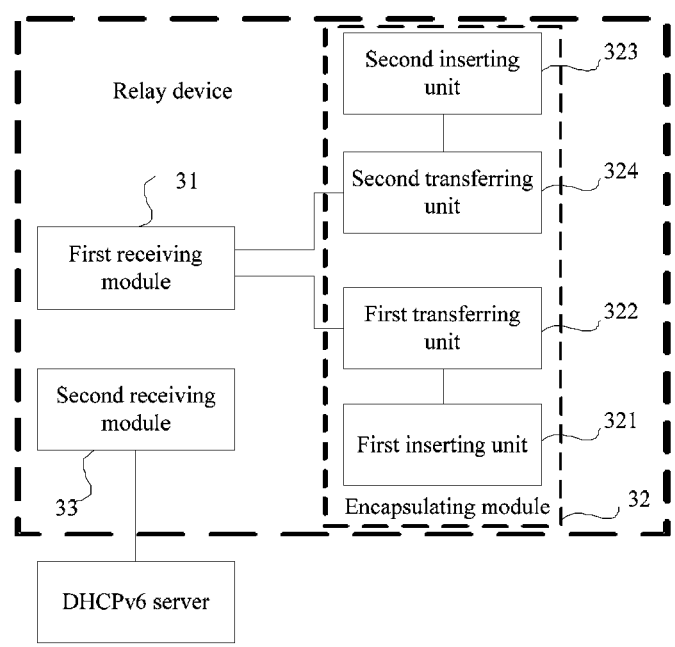
FIG. 4 is a schematic structural diagram of a relay device according to another embodiment of the present application.

FIG. 4 is a schematic structural diagram of a relay device according to another embodiment of the present application. FIG. 4 is an extension based on FIG. 3, where the encapsulating module 32 includes a first inserting unit 321 and a first transferring unit 322.

The first inserting unit 321 is configured to insert an option corresponding to each piece of the authorization information into the Relay-Forward message. The first transferring unit 322 is connected to the first inserting unit 321 and the first receiving unit 31 and is configured to encapsulate each piece of the authorization information in the corresponding option, and send the option to the DHCPv6 server.

The functional units above may be configured to execute the process of the first implementation manner of step 4 in the embodiment shown in FIG. 2B. For detailed operation principles, no further details are provided herein and reference may be made to the descriptions in the foregoing method embodiments.

As shown in FIG. 4, the encapsulating module 32 in this embodiment may further include a second inserting unit 323 and a second transferring unit 324.

The second inserting unit 323 is configured to insert an option corresponding to all the authorization information into the Relay-Reply message; and the second transferring unit 324 is connected to the second inserting unit 323 and the first receiving module 31 and is configured to encapsulate all the authorization information in the option and send the option to the DHCPv6 server.

Further, the second transferring unit 324 is specifically configured to insert a sub-option corresponding to each piece of the authorization information into the option, encapsulate each piece of the authorization information in the corresponding sub-option, and send the sub-option to the DHCPv6 server.

In the DHCPv6 allocation process, each piece of the authorization information may be Framed-Pool, Delegated-IPv6-Prefix-Pool, Stateful-IPv6-Address-Pool, Delegated-IPv6-Prefix, Framed-IPv6-Address, or the like.

Further, the relay device in this embodiment further includes a second receiving module 33, where the second receiving module 33 is configured to receive configuration information which is delivered by the DHCPv6 server to the DHCPv6 client according to the authorization information.

The second receiving module 33 may be configured to execute a corresponding process in the method shown in FIG. 2B. For detailed operation principles, no further details are provided herein and reference may be made to the descriptions in the foregoing method embodiments.

The relay device in this embodiment implements insertion of an option into a Relay-Forward message by using an inserting unit and a transferring unit, and the relay device sends authorization information to a DHCPv6 server by using the option field; and the DHCPv6 server allocates correct configuration information to a CPE according to the authorization information encapsulated in the received option, thereby solving the problem in the prior art that authorization information delivered by an AAA server cannot be transferred to a DHCPv6 server by using a DHCPv6 process. In addition, by using the method in this embodiment, the AAA server and the DHCPv6 server may be two devices independent from each other, thereby solving a network restraint caused by combining the AAA server and the DHCPv6 server into one server and better facilitating development of an IPv6 service. Further, in this embodiment, the authorization information delivered by the AAA server is sent to the DHCPv6 server, so that the DHCPv6 server can dynamically allocate an IPv6 address or an IPv6 prefix in a designated address pool or prefix pool to a DHCPv6 client according to the authorization information, or designates a specific IPv6 address or IPv6 prefix for a DHCPv6 client according to the authorization information, thereby better fulfilling a flexibility requirement of an IPv6 service on configuration of a user address.

Figure 5:
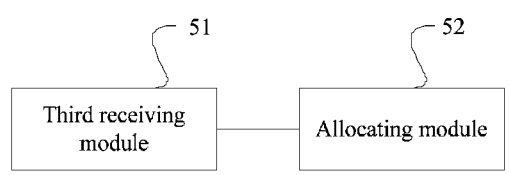
FIG. 5 is a schematic structural diagram of a server according to an embodiment of the present application.

FIG. 5 is a schematic structural diagram of a server according to an embodiment of the present application. As shown in FIG. 5, the server in this embodiment includes a third receiving module 51 and an allocating module 52.

The third receiving module 51 is configured to receive authorization information which is encapsulated by using an option in a Relay-Forward message in a DHCPv6 process and sent by a relay device, where the authorization information is delivered by an AAA server to the relay device. The allocating module 52 is connected to the third receiving module 51 and is configured to allocate correct configuration information to a DHCPv6 client according to the authorization information.

The authorization information may be Framed-Pool, Delegated-IPv6-Prefix-Pool, Stateful-IPv6-Address-Pool, Delegated-IPv6-Prefix, or Framed-IPv6-Address delivered by the AAA server in a DHCPv6 allocation process, but is not limited thereto.

The server in this embodiment may be a DHCPv6 server in a DHCPv6 allocation process and the functional modules of the server may be configured to execute a corresponding process in the embodiment shown in FIG. 2B. For detailed operation principles, no further details are provided herein and reference may be made to the corresponding descriptions in the foregoing embodiments. The server provided in the embodiment of the present application cooperates with a relay device provided in the embodiment of the present application, and receives authorization information transferred by the relay device by using an option inserted into a Relay-Forward message; and the server can allocate correct configuration information to a client according to the authorization information, thereby solving the problem in the prior art that authorization information delivered by an AAA server cannot be transferred to a DHCPv6 server by using a DHCPv6 process.

It should be noted herein that, when the authorization information is not information related to address allocation, the server in this embodiment may not perform address information allocation based on the authorization information but may still receive the authorization information sent by the relay device.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The storage medium includes: any medium that can store program code, such as a ROM, a RAM, a magnetic disk, an optical disc, and the like.

It should be finally noted that the foregoing embodiments are merely intended to describe the technical solutions of the present application rather than to limit the present application. Although the present application is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause the nature of corresponding technical solutions to depart from the scope of the technical solutions of the embodiments of the present application.

What is claimed is:

1. A method performed by a Dynamic Host Configuration Protocol (DHCP) relay device for transferring authorization information, the method comprising:
   receiving, by the DHCP relay device, a Solicit message from a DHCP client for soliciting address information;
   receiving, by the DHCP relay device, authorization information delivered by an Authentication-Authorization-Accounting (AAA) server, wherein the authorization information comprises a designated IP prefix which is associated with the address information solicited by the DHCP client, wherein the designated IP prefix is used by a DHCP server to designate a specific IP prefix for the DHCP client;
   encapsulating, by the DHCP relay device, the Solicit message and the authorization information in a Relay-Forward message;
   sending, by the DHCP relay device, the Relay-Forward message to the DHCP server; and
   receiving, by the DHCP relay device, the specific IP prefix from the DHCP server.

2. The method for transferring authorization information according to claim 1, further comprising:
   receiving, by the DHCP relay device, corresponding configuration information which is provided by the DHCP server for the DHCP client according to the received authorization information.

3. A Dynamic Host Configuration Protocol (DHCP) relay device comprising a processor and a non-transitory computer readable medium containing instructions that when executed by the processor cause the processor to:
   receive a Solicit message from a DHCP client for soliciting address information;
   receive authorization information delivered by an Authentication-Authorization-Accounting (AAA) server, wherein the authorization information comprises a designated IP prefix which is associated with the address information solicited by the DHCP client, wherein the designated IP prefix is used by a DHCP server to designate a specific IP prefix for the DHCP client;

encapsulate the Solicit message and the authorization information in a Relay-Forward message;

send the Relay-Forward message to the DHCP server; and receive the specific IP prefix from the DHCP server.

4. The DHCP relay device according to claim 3, wherein the processor is further configured to:

receive corresponding configuration information which is provided by the DHCP server for a DHCP client according to the received authorization information.

5. A Dynamic Host Configuration Protocol (DHCP) server comprising a processor and a non-transitory computer readable medium containing instructions that when executed by the processor cause the processor to:

receive a Relay-Forward message from a DHCP relay device, wherein the Relay-Forward message comprises a Solicit message and authorization information, the Solicit message is sent from a DHCP client to the DHCP relay device to solicit address information, the authorization information is from an Authentication-Authorization-Accounting (AAA) server to the DHCP relay device and the authorization information comprises a designated IP prefix which is associated with the address information solicited by the DHCP client; and designate a specific IP prefix for the DHCP client according to the designated IP prefix.

6. A system comprising a Dynamic Host Configuration Protocol (DHCP) relay device and an Authentication-Authorization-Accounting (AAA) server, wherein the DHCP relay device comprises a processor and a non-transitory computer readable medium containing instructions that when executed by the processor cause the processor to:

receive a Solicit message from a DHCP client for soliciting address information;

receive authorization information delivered by the AAA server, wherein the authorization information comprises a designated IP prefix which is associated with the address information solicited by the DHCP client, wherein the designated IP prefix is used by a DHCP server to designate a specific IP prefix for the DHCP client;

encapsulate the Solicit message and the authorization information in a Relay-Forward message;

send the Relay-Forward message to the DHCP server; and receive the specific IP prefix from the DHCP server.

7. The system according to claim 6, wherein the system further comprises the DHCP server.

* * * * *